(12) United States Patent
Reaz et al.

(10) Patent No.: US 11,500,837 B1
(45) Date of Patent: Nov. 15, 2022

(54) AUTOMATING OPTIMIZATIONS FOR ITEMS IN A HIERARCHICAL DATA STORE

(71) Applicant: Amazon Technologies, Inc., Seattle, WA (US)

(72) Inventors: Ahmed Reaz, Brooklyn, NY (US); Michael Curtis James, Hudson, NJ (US); Gavin Hill, Brooklyn, NY (US); Amol Godbole, Easton, CT (US); Andy Chang, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 396 days.

(21) Appl. No.: 16/711,225

(22) Filed: Dec. 11, 2019

(51) Int. Cl.
*G06F 16/21* (2019.01)
*G06F 16/25* (2019.01)
*G06F 16/215* (2019.01)

(52) U.S. Cl.
CPC .......... *G06F 16/217* (2019.01); *G06F 16/212* (2019.01); *G06F 16/215* (2019.01); *G06F 16/252* (2019.01)

(58) Field of Classification Search
CPC .... G06F 16/217; G06F 16/215; G06F 16/212; G06F 16/252
See application file for complete search history.

(56) References Cited

U.S. PATENT DOCUMENTS

| | | | |
|---|---|---|---|
| 6,026,392 A | 2/2000 | Kouchi et al. | |
| 6,850,951 B1 | 2/2005 | Davison | |
| 7,747,606 B2* | 6/2010 | Dageville | G06F 16/24549 707/759 |
| 8,493,386 B2* | 7/2013 | Burch | H04L 63/08 345/419 |
| 9,043,292 B2 | 5/2015 | Nag Yasa et al. | |
| 2010/0083374 A1* | 4/2010 | Schmitlin | G06F 21/6218 726/21 |
| 2012/0323859 A1* | 12/2012 | Yasa | G06F 16/1748 707/E17.005 |
| 2013/0332891 A1* | 12/2013 | Schmitlin | G06Q 10/10 715/853 |
| 2015/0081667 A1* | 3/2015 | Hagenbuch | G06F 11/0709 707/718 |
| 2015/0127687 A1* | 5/2015 | Graves | G06F 16/282 707/803 |
| 2019/0121874 A1* | 4/2019 | Vilim | G06F 16/26 |
| 2020/0019633 A1* | 1/2020 | Kathirvel | G06N 20/00 |

* cited by examiner

*Primary Examiner* — Huawen A Peng
(74) *Attorney, Agent, or Firm* — S. Scott Foster; Kowert, Hood, Munyon, Rankin & Goetzel, P.C.

(57) ABSTRACT

Performance of optimizations to correct duplicate, missing, or other user-induced errors in hierarchical data storage may be automated. Relationships between items may be used to determine whether a modification should be made to items. Once identified, a determination may be made as to whether the modification will impact query performance. If so, then permission may be obtained before the modification is made. If not, then the modification may be made automatically.

20 Claims, 10 Drawing Sheets

AUTOMATING OPTIMIZATIONS FOR ITEMS IN A HIERARCHICAL DATA STORE

BACKGROUND

Hierarchical storage systems offer a graph-based data model which can store both the values of items and the relationships between the items. Such a technique offers a performant solution for storing data across multiple dimensions while preserving the relationships of data within the different dimensions. Over time, the size of data within hierarchical data storage systems can grow very large making it difficult to efficiently utilize storage, as the schemes for representing data within the data store can become obscured. Therefore, techniques that improve the utilization of storage are highly desirable.

Figure 1:
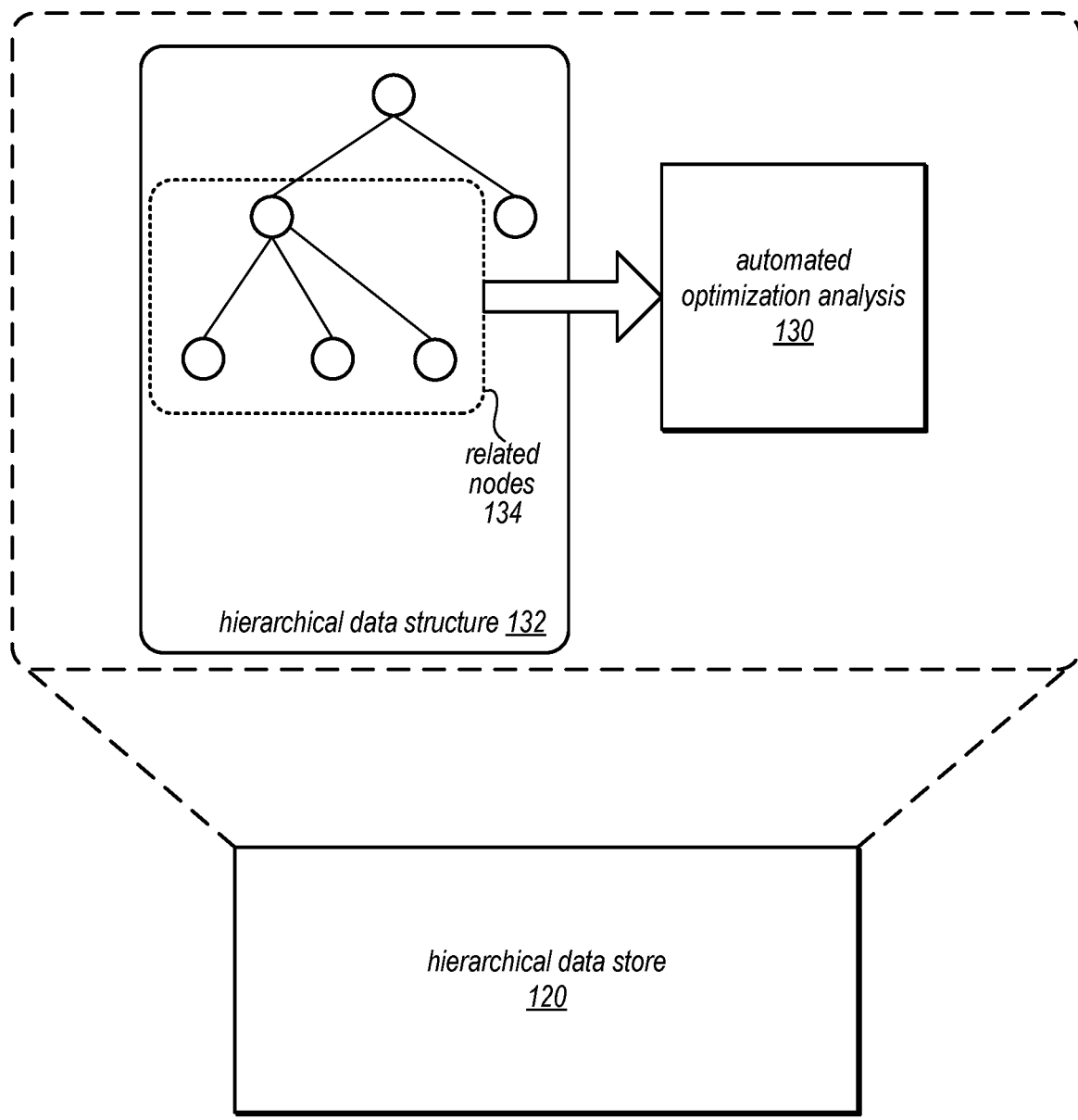
FIG. 1 is a logical block diagram illustrating automating optimizations for items in a hierarchical data store, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of automating optimizations for items in a hierarchical data store are described herein. Redundant data for large scale hierarchical data structures can increase the cognitive load on users who manipulate the data and processing load on systems that use it. For example, when items in a hierarchical data are scoped by multiple hierarchical keys which have an order of precedence and fallback, redundant data can increase processing to locate desired data. Moreover, the increase in cognitive load as a result of the redundant data is significant and impacts the ability to easily and accurately update data in the hierarchical data store. For example, it may be difficult to locate or view differences between related data which may cause redundant data when making changes to one item in a hierarchical data store.

As one skilled in the art will appreciate in light of this disclosure, certain techniques of automating optimizations for items in a hierarchical data may be capable of achieving certain advantages. For example, techniques for automating optimizations for items in a hierarchical data store may improve the performance of client applications by reducing the amount of data stored, which may reduce the number of probes or other access operations to locate data (e.g., by performing automated roll-up to remove nodes from the hierarchical data structure), as well as reducing memory or other storage requirements overall. In another example, techniques for automating optimizations for items in a hierarchical data store may improve the speed and accuracy of entering changes into a hierarchical data structure by automatically detecting and recommending opportunities to minify data using automated roll-up and/or de-duplication, and by identifying corrections to actual or potential errors when proposing changes to hierarchical data, among other techniques.

FIG. 1 is a logical block diagram illustrating automating optimizations for items in a hierarchical data store, according to some embodiments. Hierarchical data store 120 may store data in a graph-based data model to preserve both data values of items in the data store 120 and the relationships between the items. Each item in the data structure, such as hierarchical data structure 132 stored in hierarchical data store 120 may be accessed via one or more key values. The further down, into the hierarchical data structure 132, the more key values may be used to locate a node for an item (sometimes referred to a scope). For example, a search, lookup, or query technique for retrieving data from hierarchical data structure 132, may include performing different respective key lookups to traverse the relationships between nodes until the desired node is reached.

Because the hierarchical data structure preserves relationships, these relationships can be leveraged to identify optimizations that can be performed for improving the storage of the hierarchical data structure. Automated optimization analysis 130, for instance may examine and evaluate related nodes 134 to determine whether an optimization (e.g., deduplication, rollup, erroneous value, missing value, structure modification, etc.) should be applied. For example, identifying and evaluating the nodes that are child nodes of the same parent node (or common descendant nodes of an earlier ancestor node) may quickly be able to identify what information in a very large hierarchical data structure could actually indicate whether an optimization could be performed. Automated optimization analysis 130 can then determine whether an identified optimization can be performed automatically, as discussed below with regard to FIGS. 3-4 and 7, based on the impact of performing the optimization. In this way, optimizations with little or no impact can be performed automatically, in some scenarios, while those optimizations that may impact the performance of queries to hierarchical data store 120 may be recommended or deferred to a user for further analysis before performance. As some optimizations can be specific to a particular hierarchical data structure (or only identifiable by a user, designer, or administrator of a hierarchical data store), some optimizations can be added in situations for consideration and automated performance, as discussed below with regard to FIG. 4. Opportunities to improve the performance of optimization detection and recommendation can also leverage machine learning techniques to further enhance the quality of automated optimizations, as also discussed below with regard to FIG. 4.

Please note, FIG. 1 is provided as a logical illustration of a hierarchical data store providing automated optimization analysis, and is not intended to be limiting as to the physical arrangement, size, or number of components, modules, or devices, implementing a hierarchical data store.

The specification first describes an example of a hierarchical data storage service, according to various embodiments. The example hierarchical data storage service may store hierarchical data structures for many different clients, in various embodiments. Included in the description of the example network-based hierarchical data storage service are various aspects of the example network-based hierarchical data storage service along with the various interactions between the hierarchical data storage service and clients. The specification then describes a flowchart of various embodiments of methods for automating optimizations for items in a hierarchical data store. Next, the specification describes an example system that may implement the disclosed techniques. Various examples are provided throughout the specification.

Figure 2:
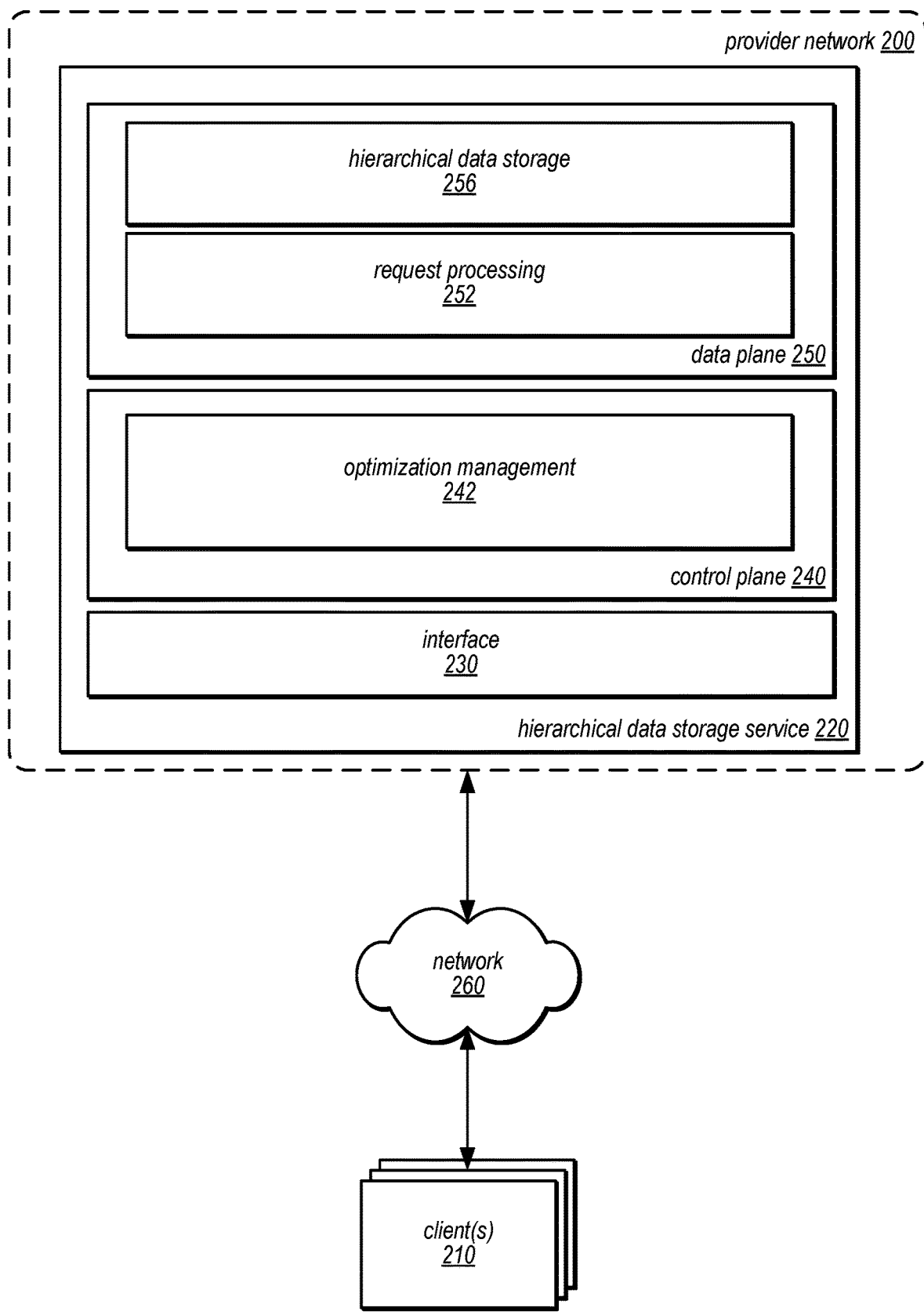
FIG. 2 is a block diagram illustrating a provider network that implements a hierarchical data storage service that implements automated optimizations for items, according to some embodiments.

FIG. 2 is a block diagram illustrating a provider network that implements a hierarchical data storage service that implements automated optimizations for items, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. In some embodiments, provider network 200 may implement a hierarchical data storage service 220, as described herein, and may provide many other computing resources or services, such as a virtual compute service and storage services, such as object storage services, block-based storage services, data warehouse storage service, archive storage service and/or any other type of network based services (which may include various other types of storage, processing, analysis, communication, event handling, visualization, and security services). Clients 210 may access these various services offered by provider network 200 via network 260. Likewise network-based services may themselves communicate and/or make use of one another to provide different services. For example, various clients of hierarchical data storage service 220 may be implemented within another service or system of provider network 200.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Hierarchical data storage service 220 may store, manage, and maintain hierarchical data structures, such as hierarchical data structure 132 discussed above with regard to FIG. 1, which may be stored in a graph-based data model, stored at various ones of storage node(s) or other storage components in data plane 250 (e.g., in single tenant or multi-tenant fashion). Clients of hierarchical data storage service 220 may operate on any subset or portion of the hierarchical data structure with transactional semantics and/or may perform path-based traversals of hierarchical data structures, in some embodiments. Such features allow clients to access hierarchical data structures in many ways. For instance, clients may utilize transactional access requests to perform multiple operations concurrently, affecting different portions (e.g., nodes) of the hierarchical data structure (e.g., reading parts of the hierarchical data structure, adding a node, and indexing some of the node's attributes, while imposing the requirement that the resulting updates of the operations within the transaction are isolated, consistent, atomic and durably stored).

Control plane 240 may implement various control functions to manage data plane 250 and other components of hierarchical data storage service 220 that provide storage of hierarchical data structures, such as directing creation and placement of new hierarchical data structures on hierarchy storage node(s), storage scaling, heat management, node repair and/or replacement. For example, various placement schemes may utilize techniques such as consistent hashing (e.g., based on hashing an identifier for individual hierarchical data structures) to identify hierarchy storage node(s) to store copies of a hierarchical data structure to place a new hierarchical data structure, or randomly mapping hierarchical data structures to a number of hierarchy storage node(s) that form a replica set in data plane 250. To provide heat management, control plane 240 may collect hierarchy storage node metrics published by each node in data plane 250. Each node may have various thresholds for performance characteristics, such as memory utilization, CPU utilization, disk utilization, and request-rate capacity. When a hierarchy storage nodes report metrics that exceed a threshold (or multiple thresholds), control plane 240 may direct the migration of one or more hierarchical data structures to different hierarchy storage nodes. Similarly, control plane 240 may detect when certain hierarchy storage nodes are unable to keep up with access requests directed to a particular replica group for a hierarchical data structure and may provision additional hierarchy storage node(s) to horizontally scale the replica group to better meet the access request demand. As discussed in detail below with regard to FIGS. 3 and 4, control plane 240 may implement optimization management 242, in various embodiments.

In some embodiments, control plane 240 (or optimization management 242) may track or record the changes made as a result of automated optimizations, recommendations or identifications of optimizations, permissions obtained, and/or logging information that describes the prior state of the hierarchical data structure before modifications. In this way, control plane 240 can support undo, rewind, or other restore operations to remove one or more modifications performed (ether automatically or in response to granted permission). In some embodiments, the logs or other historical information may be exposed for viewing via one or more interface 230 requests.

Data plane 250 may store hierarchical data structures in hierarchical data storage 256 as well as implement various components or resources, such as storage nodes to implement request processing 252 to perform queries and updates to hierarchical data. For example, request processing 252 may perform queries received to access different items in a hierarchical data structure by performing lookups according to key-values or other attributes that identify the node (e.g., scope) of the desired item. Similarly, request processing 252 may access specified items to perform updates (e.g., to write, insert, modify, delete, add, remove or otherwise modify hierarchical data structures). Request processing 252 may support various programmatic interfaces (e.g., APIs) or other query languages, commands, or protocols for accessing data.

In various embodiments, request processing 252 may be implemented as part of or interact with a storage engine configured to interact with a structure or format of data as it is stored in hierarchical data storage 256 (e.g., a key-value storage engine for data maintained in key-value storage format, relational data storage engine for data maintained in a relational storage format, etc.), which may be maintained according to the models discussed above with regard to FIG. 1. In some embodiments, hierarchical data storage 256 may be partially or completely implemented in memory or other quick access storage devices, such as random access memory devices (RAM). In some embodiments, hierarchical data storage 256 may be partially or completely implemented in persistent block-based storage devices to store hierarchical data structure data, including magnetic disk or solid state drives. In some embodiments, caching techniques may be implemented so that frequently accessed portions of data, such as frequently access portions of current hierarchical data structures are maintained in memory components whereas other portions are maintained in block-based persistent storage components. Hierarchical data storage 256 may operate multi-tenant storage for hierarchical data structures so that different hierarchical data structures maintained on behalf of different clients, accounts, customers, and the like may be maintained in hierarchical data storage 256. For example, a storage node for hierarchical data may participate in different replica groups with different storage nodes for the different hierarchical data structures stored in hierarchical data storage 256.

Generally speaking, clients 210 may encompass any type of client configurable to submit network-based services requests to provider network 200 via network 260, including requests for hierarchical data storage service 220 (e.g., a request to create or modify a hierarchical data structure to be stored in hierarchical data storage service 220, etc.). For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 210 may be an application configured to interact directly with provider network 200. In some embodiments, client 210 may be configured to generate network-based services requests according to a Representational State Transfer (REST)-style network-based services architecture, a document- or message-based network-based services architecture, or another suitable network-based services architecture.

In some embodiments, a client 210 may be configured to provide access to network-based services to other applications in a manner that is transparent to those applications. For example, client 210 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 210 and the operating system or file system on behalf of applications executing within the operating system environment.

Clients 210 may convey network-based services requests (e.g., access requests directed to hierarchical data structures in hierarchical data storage service 220) to and receive responses from provider network 200 via network 260. In various embodiments, network 260 may encompass any suitable combination of networking hardware and protocols necessary to establish network-based-based communications between clients 210 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
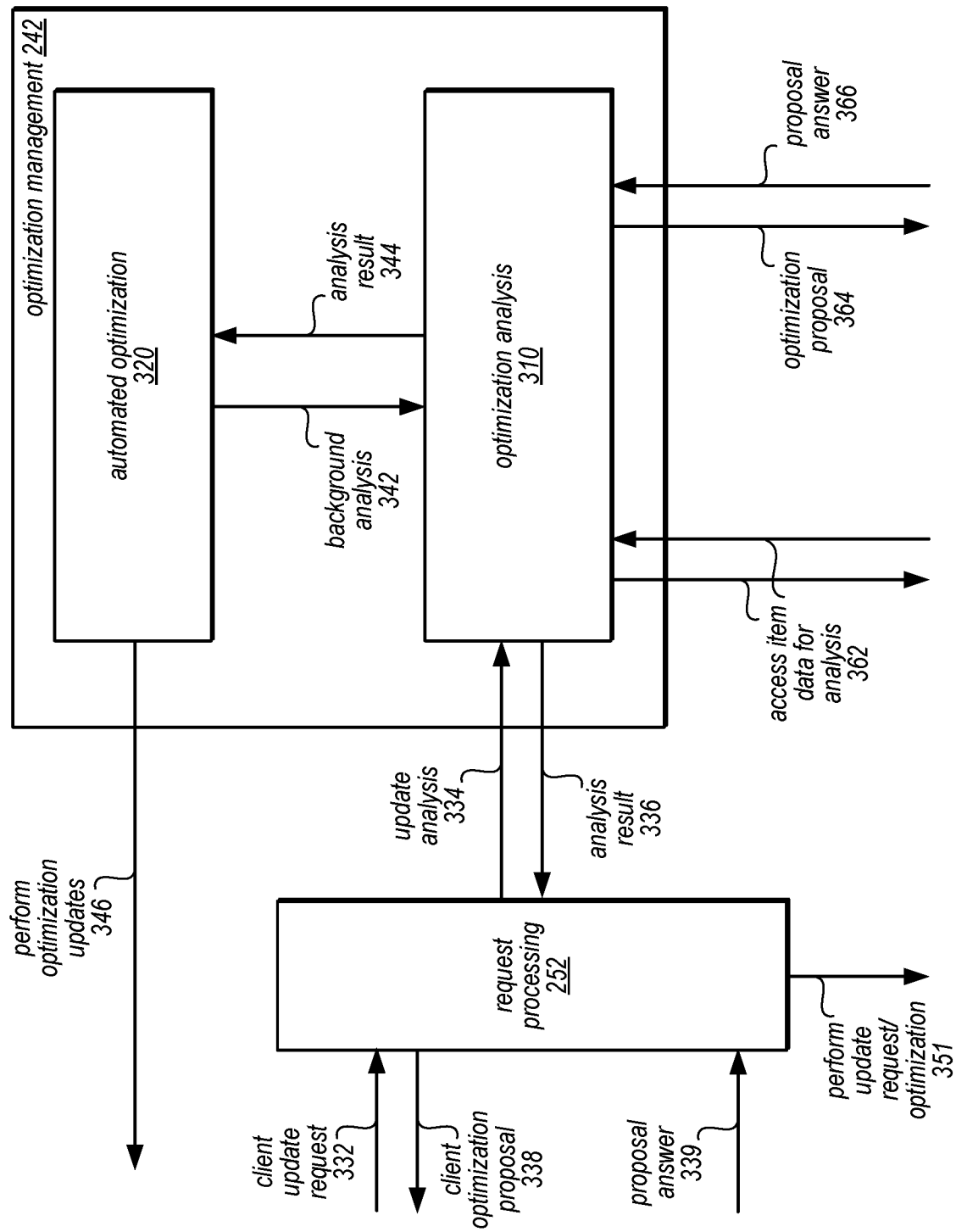
FIG. 3 is a block diagram illustrating optimization management, according to some embodiments.

Hierarchical data storage service 220 may implement optimizations for storing and updating hierarchical data, as discussed above with regard to FIG. 1. A control plane or other management feature may, in some embodiments, be responsible for coordinating and/or performing optimization modifications. However, in other embodiments, components within data plane 250 (e.g., storage nodes) may implement optimization features. FIG. 3 is a block diagram illustrating optimization management, according to some embodiments.

Figure 4:
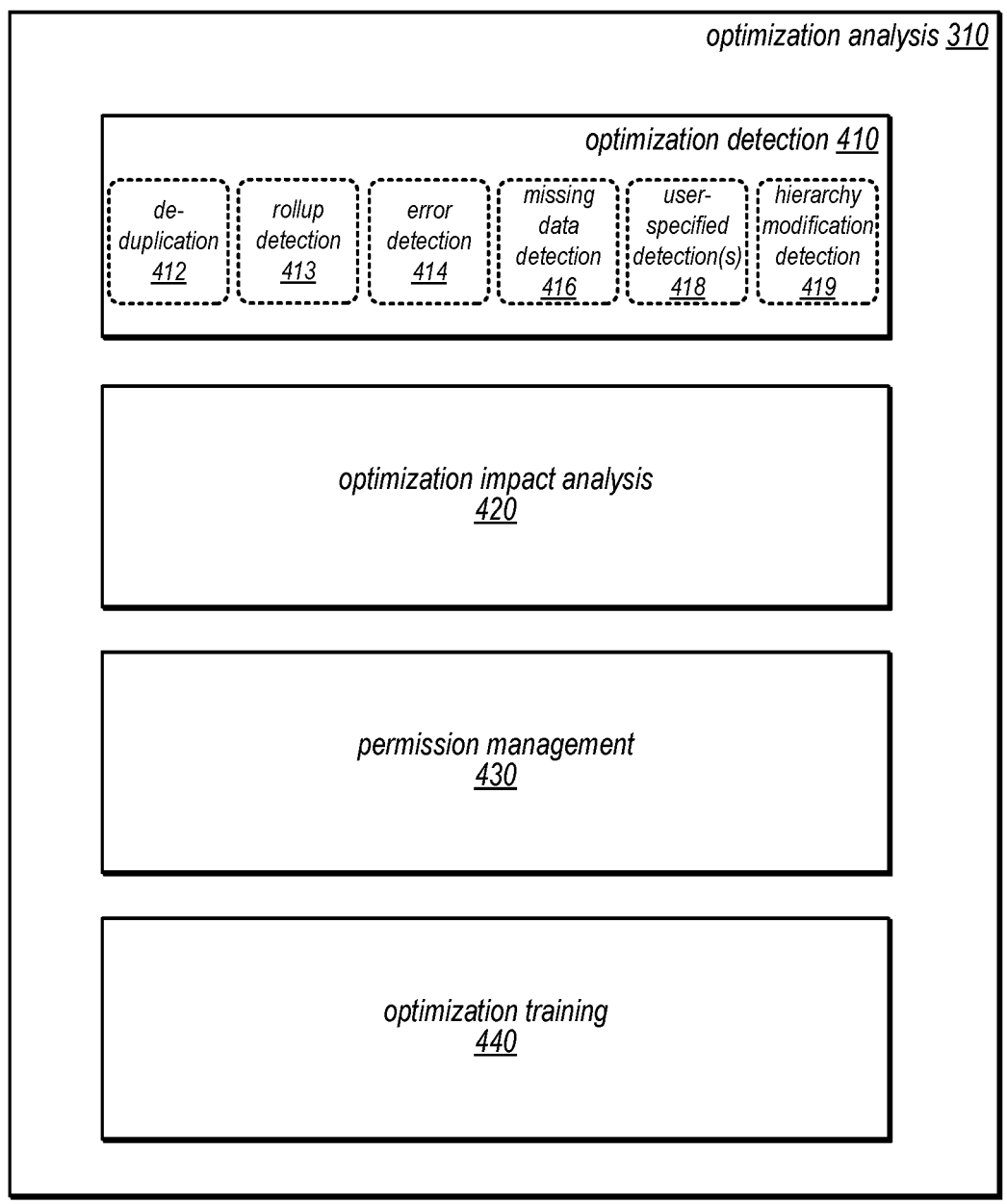
FIG. 4 is a block diagram illustrating updates to optimization management, according to some embodiments.

Optimization management 242 may implement optimization analysis 310 to evaluate and identify modifications that can optimize hierarchical data. Optimization analysis 310 may interact both with request processing 252 to handle optimization modifications that may be triggered or caused by requests to update a hierarchical data structure in some embodiments. Optimization analysis 310 may also interact with an automated optimization feature 320, which may trigger or cause optimization analysis 320 independent of client requests. FIG. 4, discussed in detail below, provides various modification techniques and analyses, as well as the techniques discussed below with regard to FIGS. 7-9. Optimization analysis 310 may access items in the hierarchical data structure for analysis as indicated at 362 (e.g., directly or via an interface or access handler, such as request processing 252). Similarly, optimization analysis 310 may perform various optimization proposals for detected or identified modifications that cannot be automatically performed 364 and handle proposal answers. For instance, agreement or other permission requirements for some identified optimizations may be enforced in order to allow performance of the identified optimization to proceed. Such optimization proposals could be sent via an interface, such as interface 230 (e.g., via graphical user interface as discussed below with regard to FIG. 5) or use alternative communication protocols, paths, or techniques (e.g., email).

Automated optimization 320 may be implemented as a background process or other workload sensitive feature of hierarchical data storage service 220. To avoid degrading or otherwise interfering with the performance of queries or other access requests, automated optimization 320 may request background analysis 342 at periodic intervals or when various workloads or operating conditions for the hierarchical data storage service are present (e.g., when workloads for queries and other access requests fall below a threshold amount). Automated optimization 320 may select or request specific types of analyses (e.g., deduplication) or may request all available analyses to be performed. Analysis results 344 may be provided back, which may indicate which (if any) optimization updates may be performed. Automated optimization 320 may then perform the various requests 346 to perform updates (e.g., either directly to storage or via request processing 252).

In at least some embodiments, optimizations to hierarchical data may be performed as part of handling a request at request processing 252. For example, a client update request 332 may be received, which may update an item (or items). The update may be checked or validated with an analysis request 334 to optimization analysis 310. Optimization analysis 336 may determine whether the update may proceed or may determine whether additional modifications should be performed when performing the update or whether corrections should be made to the update. Based on the result, request processing 252 may return a client optimization proposal 338 to a client application, which may approve or deny the proposal in an answer 339. Request processing 252 may then perform the update request (and optimization if allowed).

As noted earlier, various types of optimizations can be detected achieved through modification of hierarchical data. FIG. 4 is a block diagram illustrating updates to optimization management, according to some embodiments. Optimization analysis 310 may implement optimization detection 410 in various embodiments. For example, optimization detection may implement de-duplication 412 in some embodiments, which may detect duplicate content in related nodes according to the techniques discussed below with regard to FIG. 8. In this way, duplicate data entries can be identified and removed.

Optimization detection 410 may implement rollup detection 413, in some embodiments, as discussed in detail below with regard to FIG. 9. For example, related nodes (e.g., child nodes) can be identified and evaluated to determine that some number of related nodes include some attributes or features that could be moved or rolled-up to a common ancestor (e.g., a parent node). As there may be different scenarios or conditions where rollup may be beneficial or could remove an intentional difference among related nodes, rollup detection 413 may apply various rollup criteria for different types of rollup opportunities, some of which may be informed by user feedback (e.g., via optimization training 440 or from user-specified modifications).

Optimization detection 410 may implement error detection 414, in some embodiments, which may detect whether an erroneous value is included in a node based on the values in related nodes. If, for instance, a value does not conform to a format, schema, or pattern for the same or similar attributes at other related nodes, then the value may be possibly erroneous. Error detection 414 may prevent costly data entry (or programmatic input) errors from causing costly performance errors triggered by erroneous data in a hierarchical data structure.

In some embodiments, optimization detection 410 may implement missing data detection 416. Missing data detection 416 may determine when an attribute, feature or other portion of data for an item is missing that should be included based on the attributes, features or other portions of corresponding data in related nodes. If, for instance, other attributes include both a city/state value and a postal code value, and an attribute of a related node only includes one (or other), then the missing value may be detected. In some embodiments, missing data detection 416 may make recommendations as to the value, attribute, or other missing data to include in the hierarchical data structure.

Optimization detection 410 may be customizable, allowing users or others to specify optimizations through user-specified 418 detection techniques. For example, user-specific optimizations can be implemented, with looser performance impact requirements (e.g., particular fact pattern values that always indicates something or could be further optimized, such as scenarios in which a rollup may be performed automatically). An interface, such as interface 230 may support requests to upload optimization detectors, in some embodiments.

Optimization detection 410 may implement hierarchy modification detection 419, in some embodiments. For example, the structure of related nodes may be compared, so that if one sub-graph of a hierarchical data structure is compared with another sub-graph and does not have equivalent structure, one or more recommendations of operations to create/remove nodes and/or relationships to create equivalent structure may be suggested. If, for instance, one sub-graph of nodes includes a layer or level that is parent node of child nodes, that is itself a child of a common ancestor node with a second subgraph that does not include that layer level, then a creation of that layer in the second subgraph could be recommend (in some scenarios).

Optimization impact analysis 420 may perform various techniques to determine whether an optimization that has been identified can or should be performed. For example, in at least some embodiments, optimization impact analysis 420 may be able to determine the impact on query performance for making different types optimization modifications. In some embodiments, optimization impact analysis 420 may calculate all possible query combinations for a set of nodes, execute them (or model their execution) and determine whether any query execution has a different than expected result. Other forms of operation impact analysis may be performed, in other embodiments. For instance, an optimization impact could be related to hierarchical data store performance. Consider a scenario where an optimization may add or modify the structure of a hierarchical data structure, if the result of the optimization were to add latency, increase storage utilization, or reduce performance in some other fashion, then optimization impact analysis 420 can identify and evaluate whether such a result can be allowed to be performed.

Permission management 430 may determine when and/or how permission can be satisfied for performing modifications for which automated permissions are not given. For example, permission management 430 can send and track permission requests (e.g., via requests above in FIG. 3 and below with regard to FIG. 7). If a permission request is not satisfied after some threshold time (or other criteria), then permission management 430 may retry to re-prompt or re-propose the modifications, in some embodiments. Permission management 430 may determine when permission is not granted (e.g., either by a response or indication received that explicitly denies permission or when a period of time has passed). Permission management 430 may determine when to stop retrying for failed requests, in some embodiments.

In at least some embodiments, optimization analysis 310 may implement optimization training 440. Optimization training 440 may perform various machine learning or other statistical analyses or techniques based on the identified optimizations and permission results. If, for instance, a particular error detection scenario is repeatedly rejected for modification, then optimization training 440 may adjust the error detection criteria to avoid detecting that kind of modification. Similarly, new types of optimizations (or new versions of the optimizations may be detected). For instance, deduplication 412 may be modified to reduce the performance criteria from all nodes including the duplicate content to a smaller portion of the nodes.

Figure 5A:
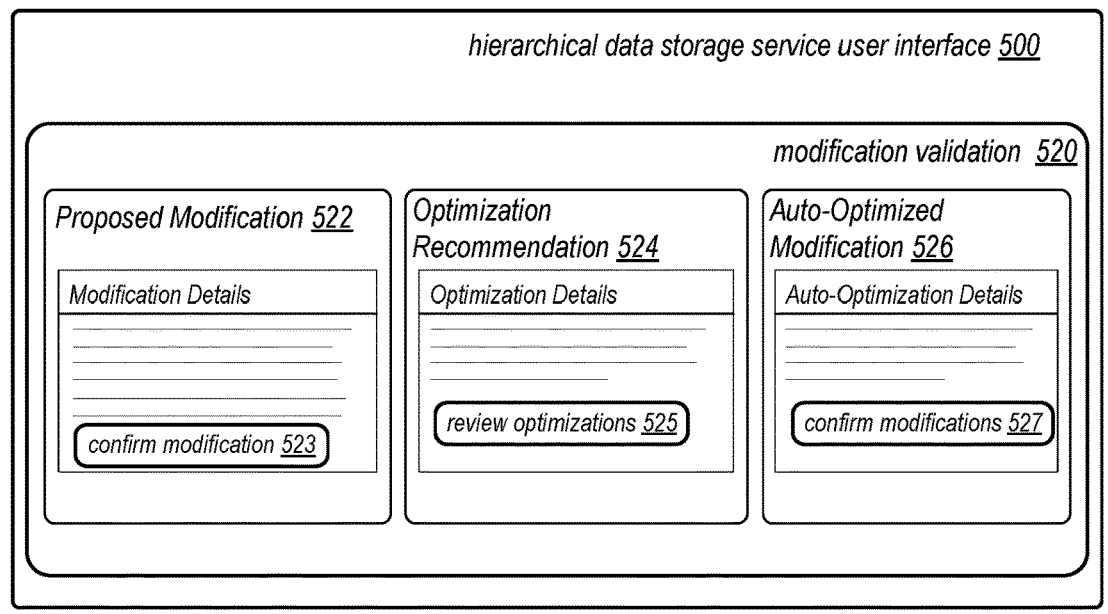
FIGS. 5A-5B are example user interfaces for requesting permission to perform rollup modifications to a hierarchical data store, according to some embodiments.
Figure 5B:
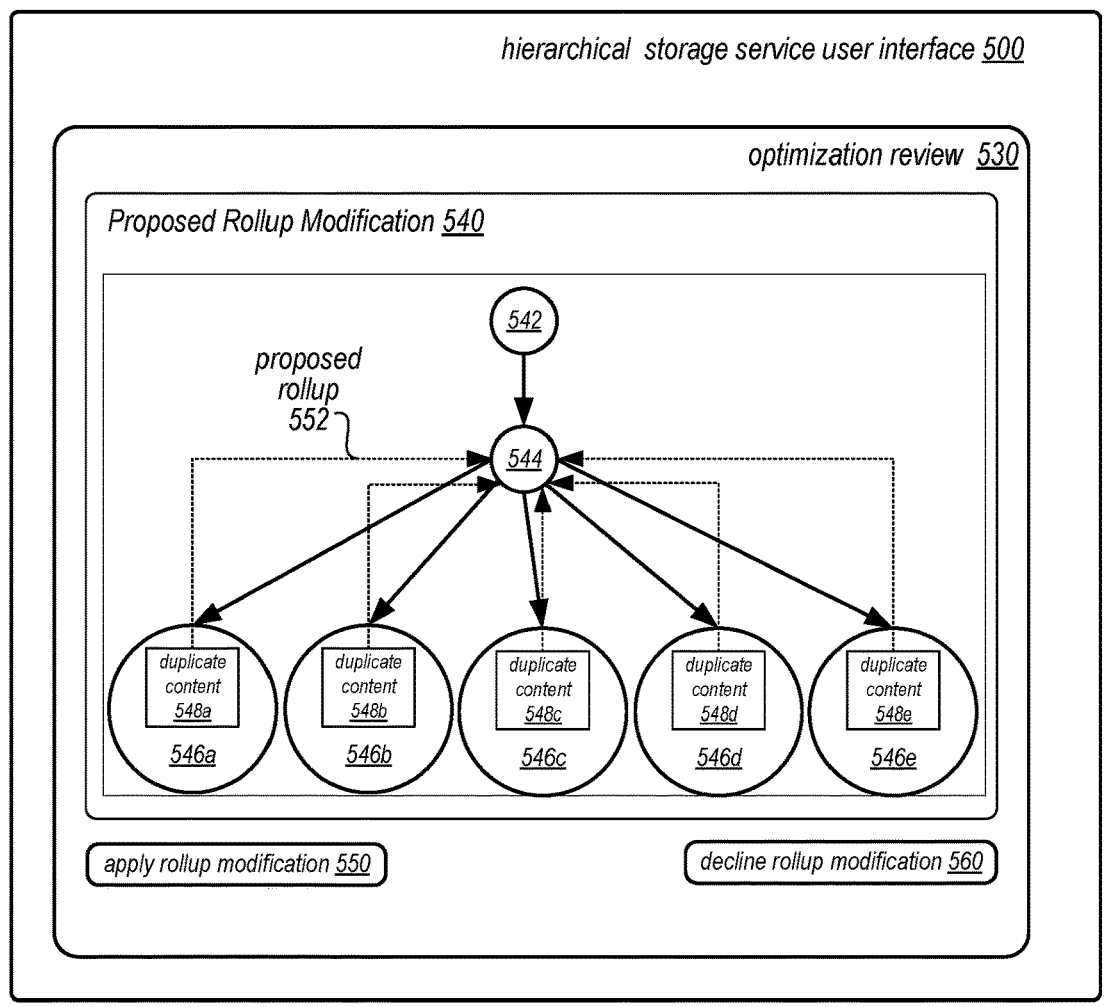

As discussed above with regard to FIGS. 3-4, modifications to items may be proposed via an interface to obtain permission and/or feedback to improve the recognition and performance of optimizations. FIGS. 5A-5B are example user interfaces for requesting permission to perform rollup modifications to a hierarchical data store, according to some embodiments. In FIG. 5A, an example hierarchical data storage service user interface 500 is illustrated. Various operations to interact with the hierarchical data storage service, including requests to query and/or update data in a hierarchal data structure may be supported by user interface 500. As part of handling an update request, in some embodiments, modification permissions and/or notifications may be incorporated into the user interface 500. For example, modification validation element 520 may be displayed after an initial request to submit one or more updates that modify the hierarchical data. A description of the modification 522, which may include a brief summary or indication of the change to be made or various other details may be provided. Additionally, an optimization recommendation element 526 may display one (or multiple) optimizations that may be performed as a result of the modification performed by the user (or in addition to the update submitted by the user), which can be reviewed for further consideration. In some embodiments, auto-optimized modification 526 may describe the details of operations that may be performed along with a proposed modification, if confirmed using element 527.

Different user interface elements may be provided to interact further over the proposed optimizations or proceed with the updates. For instance, confirm modification element 523 may, if selected, cause the modifications to be confirmed (and/or performed) without performing the optimization recommendation 526524 If however, review optimizations element 525 is selected, then further details may be provided for the optimization.

For example, as illustrated in FIG. 5B, optimization review element may provide a display that offers a graphical illustration of the modification to be performed, such as proposed rollup modification 540. In the proposal, nodes in a graph, such as nodes 542 and node 544, may illustrate the relationships which are considered in a modification evaluation, along with nodes 546*a*, 546*b*, 546*c*, 546*d*, and 546*e*. The corresponding duplicate content, 548*a*, 548*b*, 548*c*, 548*d*, and 548*e*, may also be illustrated for proposed rollup 552. In this way, a user can visualize the change across multiple nodes (e.g. multiple scopes), in order to determine whether to permit the rollup operation. A user interface element 550 may be provided to perform the rollup modification. Alternatively, another user interface element 560 may be selected to decline the rollup modification.

Figure 6:
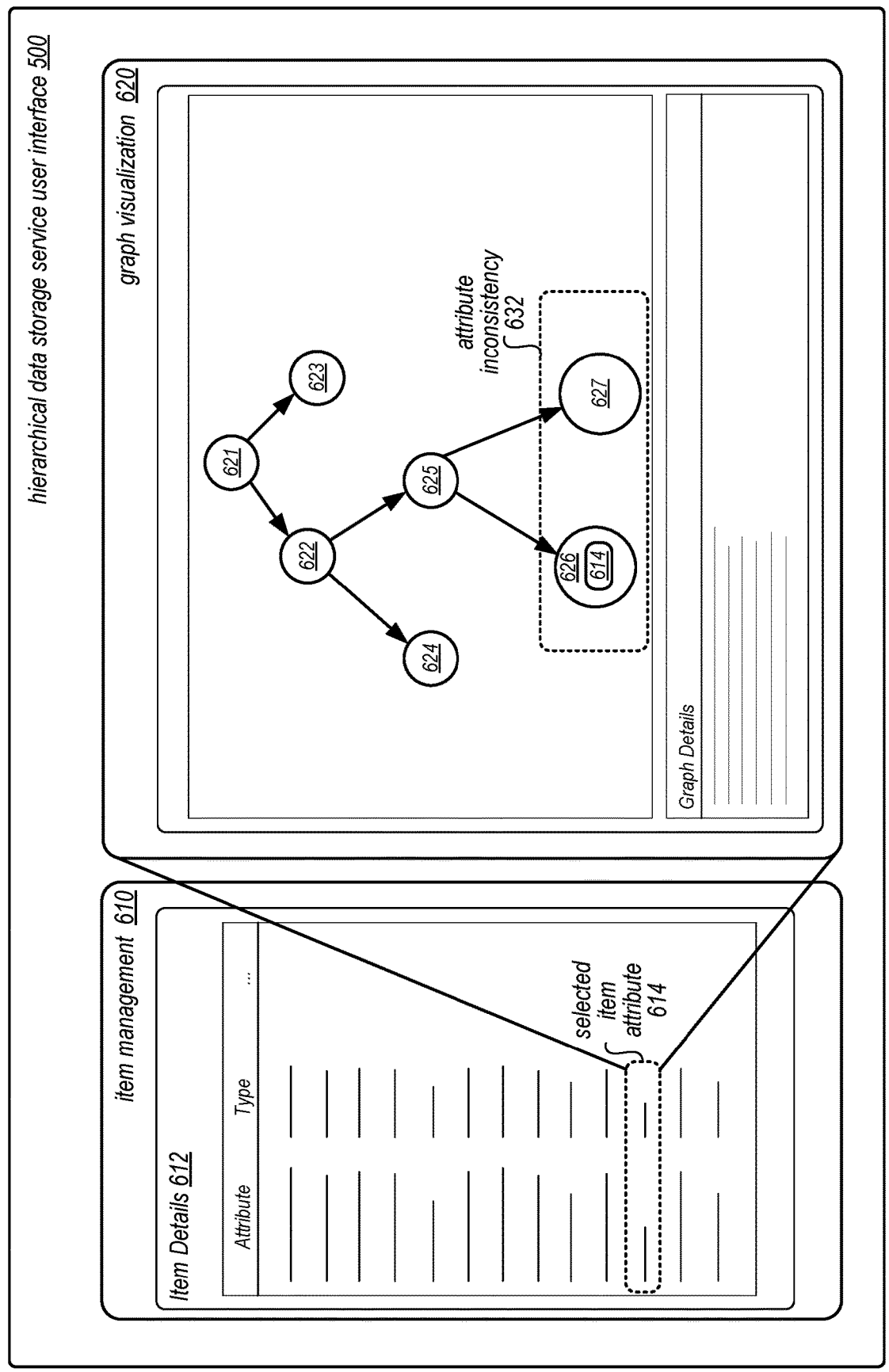
FIG. 6 is an example user interface for displaying differences between related nodes, according to some embodiments.

In some embodiments, the criteria used to detect modifications may be used to enhance the display of hierarchical data for better editing or authoring of new data. FIG. 6 is an example user interface for displaying differences between related nodes, according to some embodiments. Hierarchical data storage service user interface 500 may provide various selection menus, elements, and features, such as item management 610, for displaying and/or interacting with the various attributes of an item. Item details 612 may, for instance display various item attributes. In order to provide further insight into the optimizations that may be recommended and performed, hierarchical data storage service user interface 500 may implement graph visualization 620 which may provide for a selected item attribute, such as selected item attribute 614, a graph to identify the attribute (e.g., illustrated as part of node 626) and related nodes with respect to the selected attribute. For instance, as illustrated, various nodes 621, 622, 623, 624, 625, 626, and 627 may illustrate the various other items which may be related which may share or be impacted by the selected item attribute 614. Information related to the various features of the relationships between the nodes, as well as the attributes can be displayed (e.g., in graph details).

In some embodiments, further opportunities to identify optimizations (or potential optimizations) can be displayed. For example, the selected item attribute may implicate an attribute inconsistency between nodes 626 and 627. Such an inconsistency could be corrected (or permitted to be corrected) in response to the display.

In some embodiments (not illustrated), portions of a hierarchical data structure may be compared by generating different graphs (or sub-graphs) to compare structure and other related information for updating or modifying a hierarchical data structure. In some embodiments, optimization maybe illustrated or indicated, similar to attribute inconsistency 632 discussed above.

Figure 7:
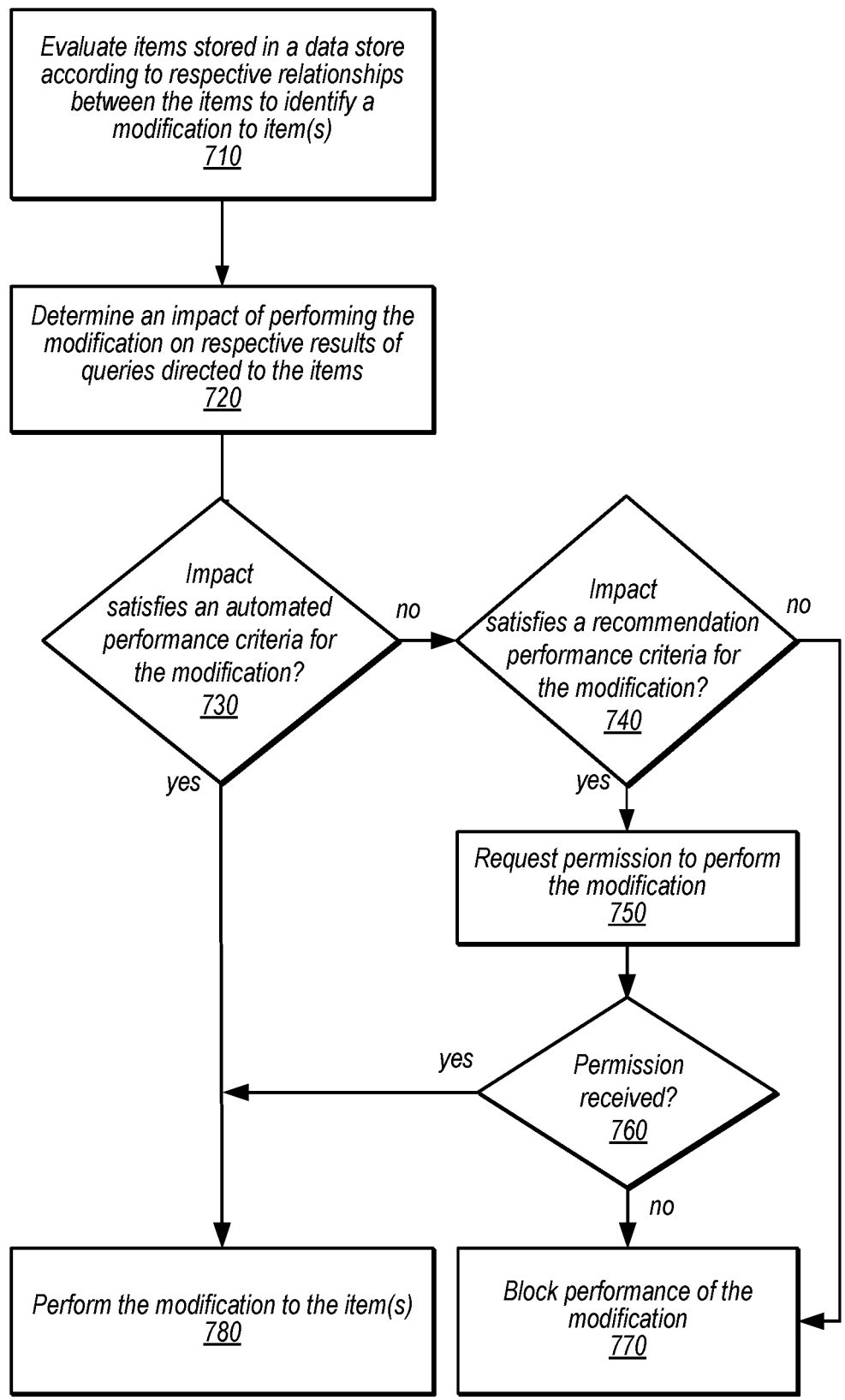
FIG. 7 is a high-level flowchart illustrating methods and techniques to implement automating optimizations for items in a hierarchical data store, according to some embodiments.

The hierarchical data storage service discussed in FIGS. 2 through 6 provide examples of data store hierarchical data. However, various other types of storage systems or services may implement automating optimizations for items in a hierarchical data store. FIG. 7 is a high-level flowchart illustrating methods and techniques to implement automating optimizations for items in a hierarchical data store, according to some embodiments. Various different distributed data stores including the embodiments described above may implement the techniques described below.

As indicated at 710, items sored in a data store may be evaluated according to respective relationships between the items to identify a modification to one or more of the items, in some embodiments. For example, as discussed above with regard to FIG. 1, a graph-based data model for the hierarchical data structure may indicate relationships between different items. Multiple items may, for instance, be related to one "parent" item corresponding to a node in a graph. These relationships can be used to evaluate differences, patterns, or other features of the related items to determine whether a modification can be made to optimize the hierarchical data structure.

For example, one type of modification that can be identified is a correction to an erroneous value. If each item that is a child node of a same parent has the same duplicate content with the exception of one item, then the corresponding content stored instead of the duplicate content can be evaluated for errors. A spelling or other analysis that examines the content value(s) itself for correctness may be performed (e.g., a misspelled version of the duplicate content could be identified). In another embodiment, the validity of the content value could be checked against other metadata that describes valid values for that item (e.g., valid entity names, such as if the content is a "state" and the value in the item is not a name of a "state" then the invalidity of the item can be recognized).

Similar to identifying techniques for erroneous data, techniques for missing data modifications can be applied in some embodiments. For example, the lack of any corresponding data in a related item that when other related items store the same value may be an indication that data is missing. Consider again a validity analysis that relies upon metadata, like a schema. That schema could specify that each item should include two values to describe some attribute. If only one value is specified and it matches the corresponding values in the related items, and the other value in the related items also matches, then it may be determined that the other value is a missing value for the item.

Figure 8:
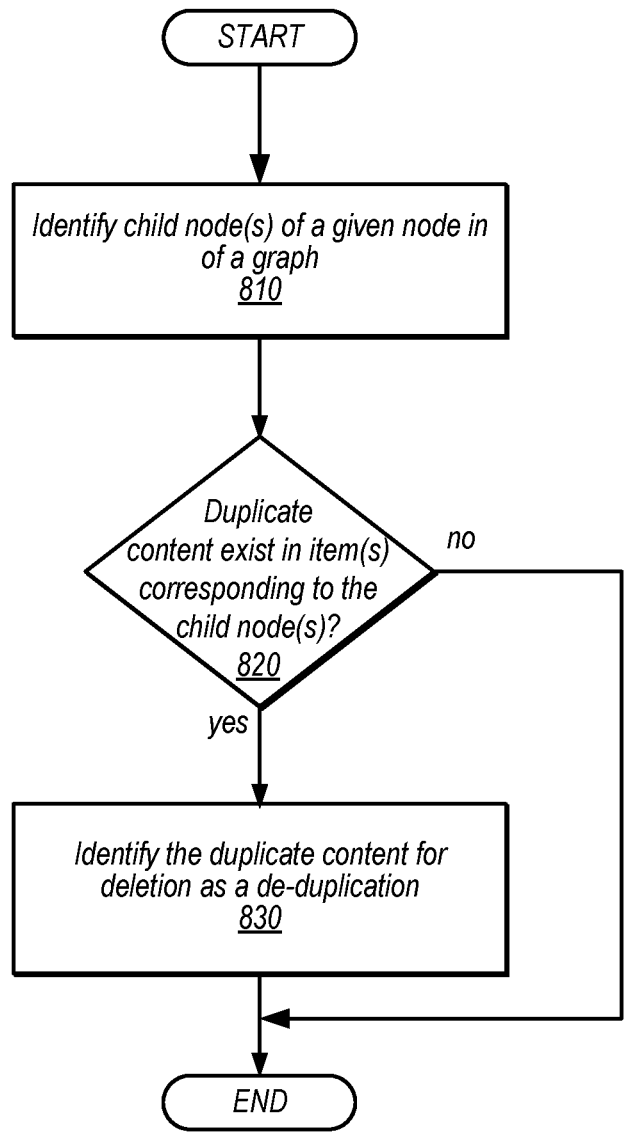
FIG. 8 is a high-level flowchart illustrating methods and techniques to implement detecting a de-deduplication modification, according to some embodiments.

FIG. 8, discussed in detail below, provides further examples of identifying another type of modification, a de-duplication modification. Moreover, as discussed above with regard to FIG. 4, modifications can be specified or provided to a hierarchical data optimization component (or other component that performs optimization modification identification), which can be performed or applied with respect to related items. Also discussed above, modifications can be learned (or whether to automatically apply a modification can be learned) based on the feedback of other modification identifications.

In some embodiments, the evaluation of items in a data store may be triggered in different circumstances. For instance, a background process or data store management feature may periodically (or aperiodically) scan items in the data store to determine if optimizations can be performed. In some embodiments, the evaluation may be triggered when a request to update the data store (e.g., including one or more of the items) is received.

As indicated at 720, a determination of impact of performing the modification may be determined on respective results of queries directed to the items, in some embodiments. For example, a query analysis may identify the different possible permutations of queries to the different items and determine whether for any of the different possible permutations, a different result would be returned, in some embodiments. If not, then the determined impact may be none. If so, then the determined impact may be quantified or characterized by the number of queries (or items queried) to which the modification may alter query performance.

Different performance criteria may be applied to the determined impact for the modification, in some embodiments. For example, in some embodiments, no query impact may be tolerated in order to perform a modification automatically, and thus any impact detected for a modification may not satisfy such a performance criteria. In some embodiments, other performance criteria may be used. If, for instance, the only query impact may be on the modified items, and that impact may cause the modified items to match the query result of another related item (e.g., in the erroneous value or missing value modifications), then the impact may still satisfy the performance criteria. In some embodiments, performance criteria may be adjusted or modified based on the feedback received from requests for permission to perform a modification. For instance, if a number of times that the feedback allows grants permission exceeds some confidence threshold, then the performance criteria requiring no impact may be lessened to impact specific to that as would be detected for each of the prior modifications for which permission was requested.

As indicated at 740, the modification to the item(s) may be performed, in various embodiments, if the impact satisfies automated performance criteria for the modification. For instance, if a rollup modification is identified, then according to the techniques discussed below with regard to FIG. 9, the rollup modification may be performed. For other modification techniques, such as the error validation or missing information, the other related items may be used to correct or fill-in the erroneous or missing information.

As indicated by the negative exit from 730, in the event that automated performance criteria for the modification is not satisfied, further consideration of whether the optimization should be performed at all may be performed. For example, a recommendation performance criteria may be evaluated to determine whether to recommend the optimization (or block performance of the modification as indicated by the negative exit from 740. If, for instance, there is a high confidence or likelihood that an optimization may be granted permission (e.g., according to the type of detected optimization, such as a unanimous set of duplicate data except for one node), then a recommendation performance criteria for the modification may be satisfied.

As indicated by the positive exit from 740, permission to perform the modification may be requested, in some embodiments, as indicated at 750. For example, the user interface examples, discussed above with regard to FIGS. 5A-6B may be used to identify the modification and/or request permission to perform the modification. In some embodiments, a notification may be provided via message or other communication. In some embodiments, a listing of modifications may be presented or provided when starting up or logging on to begin work on the hierarchical data structure (e.g., to read or write to the hierarchical data structure).

If, as indicated by the positive exit from 760, permission is received, then the modification to the item(s) may be performed, in some embodiments, as indicated at 780. In some embodiments, permission may include an indication of a value to use in the modification, such as a correction value or a missing value (which may or may not correspond to the values identified in the other items). If permission is not received, then as indicated at 770, performance of the modification may be blocked, in some embodiments. For example, the modification for the item(s) may be placed on a blacklist or ignore list so that it is not attempted again.

As noted above, one type of modification that can be performed is a d modification. A deduplication modification may remove duplicate data, saving storage space, and reducing processing time for queries (e.g., by removing extraneous data), among other performance benefits. FIG. 8 is a high-level flowchart illustrating methods and techniques to implement detecting a de-duplication modification, according to some embodiments. As indicated at 810, child node(s) of a given node in a graph may be determined, in some embodiments. For example, links, pointers, or other mapping information that identifies child nodes may be searched in some embodiments. In some embodiments, child node(s) may point or reference a parent node, and thus a level or layer deeper than the given node may be scanned or searched for entries for nodes that reference the given node.

As indicated at 820, a determination may be made as to whether duplicate content exists in the item(s) corresponding to the child node(s), in some embodiments. For example, a same field, attribute, key, or other portion of the item(s) may be compared for each of the items. If the values match, then duplicate content may be determined to exist. If duplicate content exists across more than one of the items, then the duplicate content may be identified for deletion as part of a de-duplication operation, in some embodiments, as indicated at 830.

Figure 9:
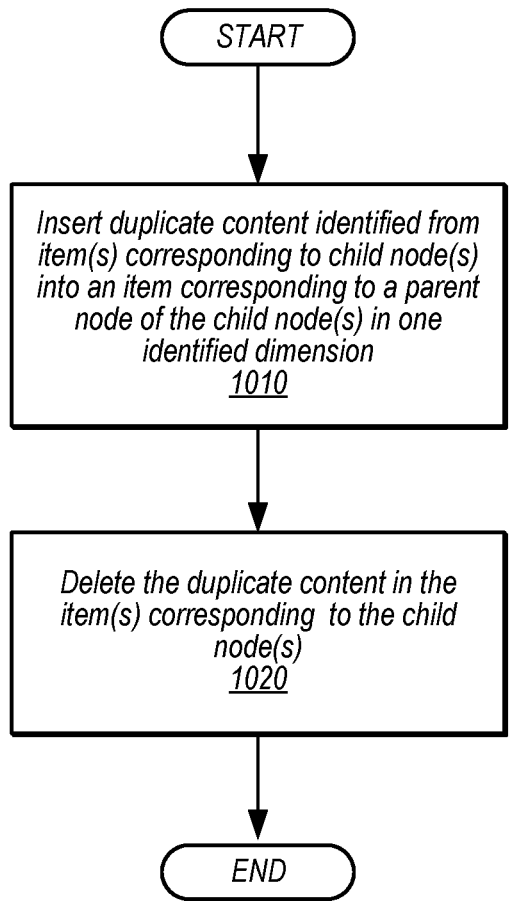
FIG. 9 is a high-level flowchart illustrating methods and techniques to implement performing a rollup modification, according to some embodiments.

FIG. 9 is a high-level flowchart illustrating methods and techniques to implement performing a rollup modification, according to some embodiments. As indicated at 1010, duplicate content identified from item(s) corresponding to child node(s) may be inserted into an item corresponding to a parent node of the child node(s) in one identified dimension. For example, update, insert, and/or write requests may be sent or performed to make the update to the item of the parent node. As indicated at 1020, the duplicate in the item(s) corresponding to the child node(s) may be deleted, in some embodiments. For instance, one or more requests to remove or remove the duplicate content may be performed with respect to the child node(s). Such techniques may be repeated for each dimension of the node in the graph identified for the rollup modification, in some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the hierarchical data storage service and/or storage services/systems described herein). The various methods as illustrated in the figures and described herein represent example embodiments of methods. The order of any method may be changed, and various elements may be added, reordered, combined, omitted, modified, etc.

Figure 10:
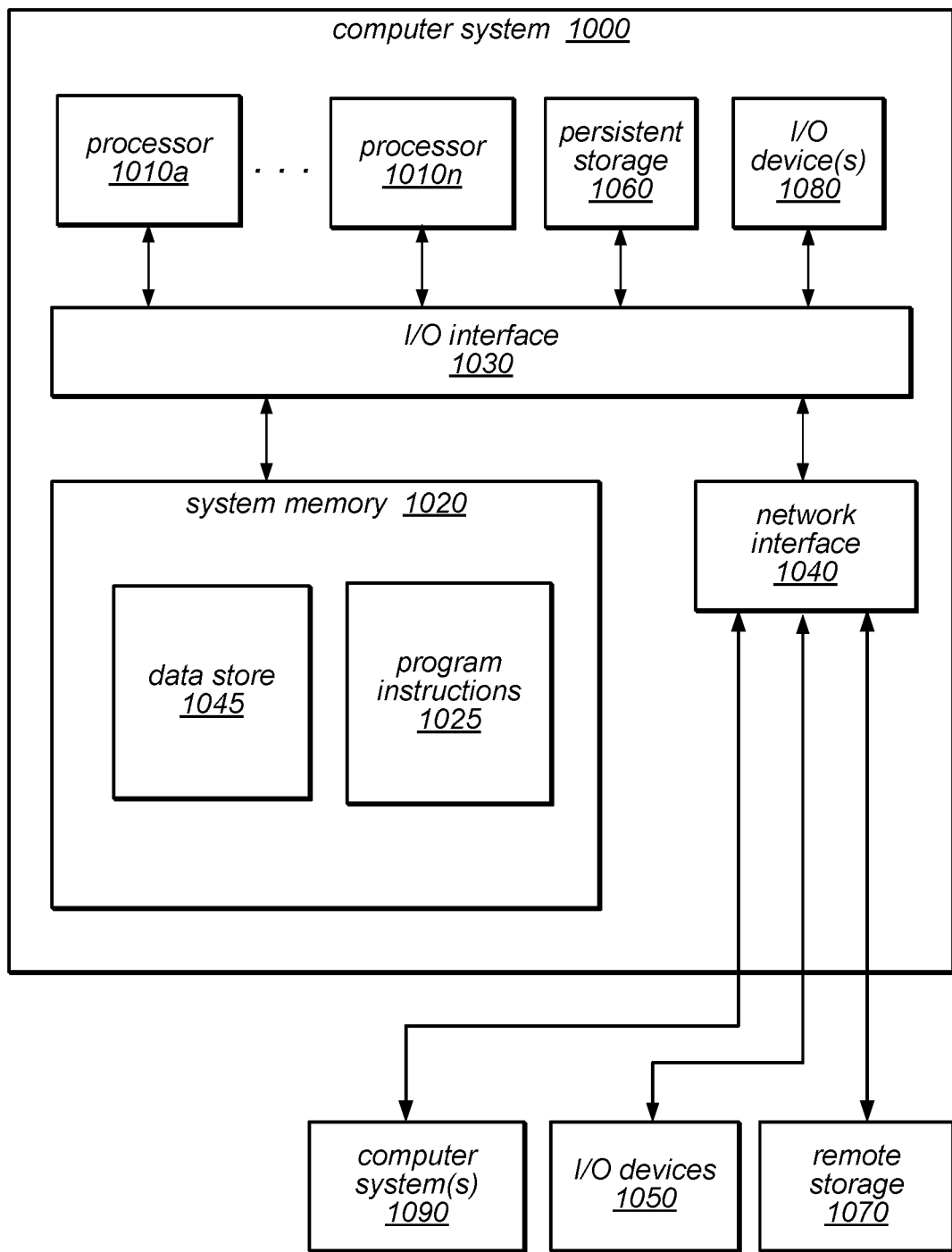
FIG. 10 is an example computer system, according to various embodiments.

FIG. 10 is a block diagram illustrating a computer system that may implement automating optimizations for items in a hierarchical data store, according to various embodiments, as well as various other systems, components, services or devices described above. For example, computer system 1000 may be configured to implement hierarchy storage nodes that maintain versions of a hierarchical data storage service, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the hierarchical storage systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in system native binary, any interpreted language such as Java™ byte-code, or in any other language such as C/C++, Java™, etc., or in any combination thereof. For example, in the illustrated embodiment, program instructions 1025 include program instructions executable to implement the functionality of a hierarchy storage nodes that maintain versions of hierarchical data structures, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/HIERARCHICAL DATA STORAGE SERVICE 220-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the hierarchy storage nodes or transaction log store described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement embodiments described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    at least one processor; and
    a memory, that stores program instructions that when executed by the at least one processor, cause the at least one processor to implement a hierarchical data store, configured to:
        store a plurality of items as respective nodes in a graph-based data model;
        evaluate the items according to relationships between the respective nodes of the items to identify a modification to one or more of the items;
        determine an impact of performing the modification on respective results of queries directed to the plurality of items; and
        perform the modification to the one or more items after determining that the impact satisfies a performance criteria for the modification.

2. The system of claim 1, wherein to evaluate the items according to relationships between the respective nodes of the items to identify the modification to one or more of the items, the hierarchical data store is configured to:
    for a given one of the nodes:
        identify a plurality of child nodes;
        determine that duplicate content exists at the child nodes; and
        identify the modification as a de-duplication modification to delete the duplicate content.

3. The system of claim 1, wherein the hierarchical data store is further configured to:
    evaluate another plurality of items according to respective relationships between the other items to identify another modification to one or more of the other items;
    determine an impact of performing the modification on respective results of queries directed to the other plurality of items does not satisfy a performance criteria for the other modification; and
    send a request for permission to perform the other modification to the one or more other items before performing the modification.

4. The system of claim 1, wherein the hierarchical data store is a hierarchical data storage service, and wherein the hierarchical data store is configured to:

before performing the modification to the one or more items:
   display, via a user interface for the hierarchical data storage service, the modification to be performed to the one or more items.

5. A method, comprising:
performing, by one or more computing devices:
   evaluating a plurality of items stored in a data store according to respective relationships between the items to identify a modification to one or more of the items, wherein the respective relationships are identified by mappings of the items to respective nodes in a graph-based data model;
   determining an impact of performing the modification on respective results of queries directed to the plurality of items; and
   performing the modification to the one or more items after determining that the impact satisfies a performance criteria for the modification.

6. The method of claim 5, further comprising:
evaluating another plurality of items stored in the data store according to respective relationships between the other items to identify another modification to one or more of the other items;
determining an impact of performing the modification on respective results of queries directed to the other plurality of items does not satisfy an automated performance criteria for the other modification;
determining that the impact satisfies a recommendation performance criteria for the modification; and
sending a request for permission to perform the other modification to the one or more other items.

7. The method of claim 6, further comprising:
receiving permission to perform the other modification; and
performing the other modification to the one or more other items.

8. The method of claim 7, wherein the permission includes a value to include when performing the other modification.

9. The method of claim 5, wherein the evaluating the plurality of items stored in the data store according to the respective relationships between the items to identify the modification to one or more of the items, comprises:
   for a given one of the nodes:
     identifying a plurality of child nodes;
     determining that duplicate content exists at the child nodes; and
     identifying the modification as a de-duplication modification to delete the duplicate content.

10. The method of claim 5, wherein performing the modification to the one or more items comprises:
   inserting the duplicate content from the child nodes into one of the items that corresponds to the parent node; and
   deleting the duplicate content in the items corresponding to the child nodes.

11. The method of claim 5, wherein the identified modification is a user-specified modification received via an interface at the data store.

12. The method of claim 5, further comprising:
receiving a request to perform an update to at least one of the plurality of items; and
performing the evaluating, the determining, and the performing the modification in response to receiving the request.

13. The method of claim 5, further comprising:
before determining that the impact satisfies the performance criteria for the modification, updating the performance criteria based, at least in part, on one or more prior modifications identified at the data store and one or more respective permission responses for the one or more prior modifications.

14. One or more non-transitory, computer-readable storage media, storing program instructions that when executed on or across one or more computing devices cause the one or more computing devices to implement:
   evaluating a plurality of items stored in a data store according to respective relationships between the items to identify a modification to one or more of the items, wherein the respective relationships are identified by mappings of the items to respective nodes in a graph-based data model;
   comparing an impact of performing the modification on respective results of queries directed to the plurality of items with a performance criteria for the modification to determine that the impact satisfies the performance criteria for the modification; and
   performing the modification to the one or more items after determining that the impact satisfies the performance criteria for the modification.

15. The one or more non-transitory, computer-readable storage media of claim 14, further wherein the one or more non-transitory, computer-readable storage media store further program instructions that when executed on or across the one or more computing devices cause the one or more computing devices to further implement:
   causing, by a background process, an event to trigger performance of an optimization analysis; and
   performing the evaluating, the comparing, and the performing the modification in response to the event.

16. The one or more non-transitory, computer-readable storage media of claim 14, wherein the one or more non-transitory, computer-readable storage media store further program instructions that when executed on or across the one or more computing devices cause the one or more computing devices to further implement:
   evaluating another plurality of items stored in the data store according to respective relationships between the other items to identify another modification to one or more of the other items;
   comparing an impact of performing the modification on respective results of queries directed to the other plurality of items with a performance criteria for the other modification to determine that the impact does not satisfy the performance criteria for the other modification; and
   sending a request for permission to perform the other modification to the one or more other items.

17. The one or more non-transitory, computer-readable storage media of claim 16, wherein the one or more non-transitory, computer-readable storage media store further program instructions that when executed on or across the one or more computing devices cause the one or more computing devices to further implement:
   receiving a response that does not grant permission to perform the other modification; and
   blocking performance of the other modification to the one or more other items.

18. The one or more non-transitory, computer-readable storage media of claim 14, wherein, in the evaluating the plurality of items stored in the data store according to the respective relationships between the items to identify the modification to one or more of the items, the program instructions cause the one or more computing devices to further implement:
    for a given one of the nodes:
        identifying a plurality of child nodes;
        determining that duplicate content exists at the child nodes; and
        identifying the modification as a modification to delete the duplicate content.

19. The one or more non-transitory, computer-readable storage media of claim 14, wherein, in the evaluating the plurality of items stored in the data store according to the respective relationships between the items to identify the modification to one or more of the items, the program instructions cause the one or more computing devices to further implement identifying that a data value for one of the items is erroneous based on a comparison with corresponding data values in other ones of the items.

20. The one or more non-transitory, computer-readable storage media of claim 14, wherein the one or more non-transitory, computer-readable storage media store further program instructions that when executed on or across the one or more computing devices cause the one or more computing devices to further implement:
    before determining that the impact satisfies the performance criteria for the modification, updating the performance criteria based, at least in part, on one or more prior modifications identified at the data store and one or more respective permission responses for the one or more prior modifications.

\* \* \* \* \*